United States Patent
Kubota et al.

[11] Patent Number: 5,887,907
[45] Date of Patent: Mar. 30, 1999

[54] JOINT APPARATUS FOR AUTOMOBILE EXHAUST PIPE

[75] Inventors: Shuichi Kubota; Toshiyuki Nishio, both of Fujisawa, Japan

[73] Assignee: Oiles Corporation, Tokyo, Japan

[21] Appl. No.: 859,495

[22] Filed: May 20, 1997

[51] Int. Cl.[6] .................................................. F16L 39/04
[52] U.S. Cl. ..................... 285/131.1; 285/124.1
[58] Field of Search .................... 285/49, 124.1, 285/124.2, 124.3, 124.4, 124.5, 131.1, 118

[56] References Cited

U.S. PATENT DOCUMENTS

| | | | |
|---|---|---|---|
| 3,399,909 | 9/1968 | Ambrose | 285/124.1 |
| 3,486,773 | 12/1969 | Deplante | 285/124.1 |
| 3,701,551 | 10/1972 | Morgan | 285/124.1 |
| 4,659,117 | 4/1987 | Holzhausen | 285/49 |
| 4,875,716 | 10/1989 | Winzen et al. | 285/124.4 |
| 5,318,329 | 6/1994 | Suzuki et al. | 285/49 |

FOREIGN PATENT DOCUMENTS

| | | |
|---|---|---|
| 2 346 631 | 10/1977 | France . |
| 2856275 | 2/1980 | Germany .............................. 285/118 |
| 3503148 | 8/1986 | Germany .............................. 285/118 |
| 195 00 264 C1 | 7/1996 | Germany . |
| 40-2142994 | 6/1990 | Japan .................................... 285/118 |
| 1502934 | 3/1978 | United Kingdom .................. 285/118 |

*Primary Examiner*—Eric K. Nicholson
*Attorney, Agent, or Firm*—Nixon & Vanderhye

[57] ABSTRACT

In a joint apparatus for an automobile exhaust pipe, each of a pair of juxtaposed exhaust pipes and each of a pair of mutually coupled branch pipes of a bifurcated exhaust pipe are coupled to each other. The joint apparatus is provided with a spherical joint for coupling one of the pair of exhaust pipes to one of the branch pipes of the bifurcated exhaust pipe which is disposed in correspondence with the one exhaust pipe; and a flexible extensible joint for coupling another one of the pair of exhaust pipes to another one of the branch pipes which is disposed in correspondence with the another exhaust pipe.

20 Claims, 2 Drawing Sheets

JOINT APPARATUS FOR AUTOMOBILE EXHAUST PIPE

BACKGROUND OF THE INVENTION

The present invention relates to a joint apparatus for an automobile exhaust pipe.

In an automobile engine, in a case where exhaust gases from exhaust ports of respective cylinders are introduced into a muffler through a manifold, if an attempt is made to introduce the exhaust gases, which have passed through the manifold, into the muffler by means of an integrating exhaust pipe immediately after the manifold, the exhaust gases interfere with each other, deteriorating the exhaust efficiency. When the exhaust of an ensuing cylinder is started when the exhaust gases in the exhaust pipe are in the state of low pressure, the exhaust gases of the cylinder are forcibly exhausted, and the exhaust efficiency improves. Therefore, a means has been proposed in which, in a four-cylinder system, for example, the exhaust gases from cylinders whose timings of intake, compression, combustion, and exhaust are utterly reverse are made to converge, respectively, so as to enhance the exhaust efficiency.

In such a case, to prevent the transmission of vibrations from the manifold side to the muffler side, a joint apparatus in which each of a pair of juxtaposed exhaust pipes and each of a pair of mutually coupled branch pipes of a bifurcated exhaust pipe are coupled to each other is used immediately after the manifold. As shown in FIG. 2, this joint apparatus is generally provided with a pair of spherical joints 74 and 75 having common flanges 71 and 72 and resilient means 73. The spherical joint 74 is provided with a spherical annular seal member 78 fitted over an outer surface of an exhaust pipe 77 coupled to an exhaust port of a first cylinder by means of a manifold 76, while the spherical joint 75 is provided with a spherical annular seal member 80 fitted over an outer surface of an exhaust pipe 79 coupled to a fourth cylinder by means of the manifold 76. The common flange 71 is secured to the exhaust pipes 77 and 79, while the common flange 72 having spherical seats 83 and 84, on which spherical annular surfaces 81 and 82 of the spherical annular seal members 78 and 80 are respectively seated slidably, is secured to each of branch pipes 86 and 87 of a bifurcated exhaust pipe 85 coupled to the muffler side. The resilient means 73 is constituted by two resilient devices 61 and 62 which are symmetrically fitted to the flanges 71 and 72. Each of the resilient devices 61 and 62 is provided with a bolt 90 disposed in such a manner as to be passed through the flanges 71 and 72, a nut 88 meshing with the bolt 90, and a coil spring 89 interposed between a head of the bolt 90 and the flange 72. The resilient means 73 causes the two flanges 71 and 72 to approach each other by the resilient forces of the coil springs 89 so as to cause the spherical seats 83 and 84 to be resiliently pressed against the spherical annular surfaces 81 and 82.

In the joint apparatus shown in FIG. 2, the relative swinging motion of the bifurcated exhaust pipe 85 and the exhaust pipes 77 and 79 is allowed by the sliding motion of the spherical seats 83 and 84 with respect to the spherical annular surfaces 81 and 82. However, in the relative swinging motion in a direction perpendicular to the plane of the drawing of FIG. 2, the spherical seats 83 and 84 are slid with respect to the spherical annular surfaces 81 and 82 without causing a gap between each of the spherical annular surfaces 81 and 82 and each of the spherical seats 83 and 84, whereas in the relative swinging motion in a direction parallel to the plane of the drawing, gaps can be caused alternately between the spherical annular surface 81 and the spherical seat 83 and between the spherical annular surface 82 and the spherical seat 84, thereby possibly causing the exhaust gases from leaking through the gaps.

SUMMARY OF THE INVENTION

The present invention has been devised in view of the above-described circumstances, and it is an object of the present invention to provide a joint apparatus for an automobile exhaust pipe in which each of a pair of juxtaposed exhaust pipes and each of a pair of mutually coupled branch pipes of a bifurcated exhaust pipe are coupled to each other, and which is capable of preventing the leakage of exhaust gases.

Another object of the present invention is to provide a joint apparatus for an automobile exhaust pipe which excels in durability and is capable of assuring ease of vibration of a degree similar to that of a joint apparatus for a single pipe.

In accordance with the present invention, the above objects are attained by a joint apparatus for an automobile exhaust pipe in which each of a pair of juxtaposed exhaust pipes and each of a pair of mutually coupled branch pipes of a bifurcated exhaust pipe are coupled to each other, comprising: a spherical joint for coupling one of the pair of exhaust pipes to one of the branch pipes of the bifurcated exhaust pipe which is disposed in correspondence with the one exhaust pipe; and a flexible extensible joint for coupling another one of the pair of exhaust pipes to another one of the branch pipes which is disposed in correspondence with the another exhaust pipe.

In the joint apparatus in accordance with the present invention, the relative swinging motion of the two exhaust pipes takes place while being restricted by the spherical joint. At this juncture, the flexible extensible joint undergoes bending and extension and contraction, permitting the relative swinging motion of the two exhaust pipes. Since one joint is the flexible extensible joint, the relative swinging motion of the two exhaust pipes is effected without causing a gap in the spherical joint. In addition, since the relative swinging motion of the two exhaust pipes and the axial relative movement thereof are restricted by the spherical joint, the excessive extension, contraction, and bending of the extensible joint is prevented, thereby making it possible to favorably prevent damage to the extensible joint.

In addition, in the present invention, the spherical joint is provided with a spherical annular seal member fitted over one end of one of the one exhaust pipe and the one branch pipe; a first flange means secured to one of the one exhaust pipe and the one branch pipe; a second flange means which has a spherical seat on which a spherical annular surface of the spherical annular seal member is slidably seated, and which is secured to another one of the one exhaust pipe and the one branch pipe; and resilient means for causing the first and second flange means to approach each other by a resilient force so as to cause the spherical seat to be resiliently pressed against the spherical annular surface. Here, the first flange means and the second flange means may be respectively provided with through holes, and the flexible extensible joint may be disposed by being passed through the through holes.

The resilient means is provided with a pair of resilient devices fixed to the first flange means and the second flange means in an axially symmetric manner, one of the pair of resilient devices is disposed closer to the spherical annular surface than another one of the pair of resilient devices, while the another one of the pair of resilient devices is disposed on an outer side of the through holes, and a spring constant of the another one of the pair of resilient devices is arranged to be smaller than a spring constant of the one resilient device so as to balance resilient pressing forces of the spherical seat against the spherical annular surface by means of the pair of resilient devices. In this joint apparatus, in the relative swinging motion of the two exhaust pipes in the respective directions, substantially the same resilient swinging resistance can be provided with respect to the center of swinging motion, thereby making it possible to assure ease of vibration of a degree similar to that of a joint apparatus for a single pipe.

In a preferred example, the flexible extensible joint is provided with a bellows whose one end is secured to the other one of the exhaust pipes and another end secured to the other one of the branch pipes. In another preferred example, a center of the radius of curvature of the spherical joint is positioned with respect to the extensible joint, such that in the relative swinging motion of the bifurcated exhaust pipe with respect to the pair of exhaust pipes, a maximum bending occurs in the extensible joint at an axially intermediate position in the flexible extensible joint. In the case of this example, in the relative swinging motion of the two exhaust pipes, a maximum bending strain occurs in the extensible joint at the axially intermediate position in the flexible extensible joint, so that it is possible to avoid the concentration of stress at opposite ends of the extensible joint coupled respectively to the two exhaust pipes, thereby making it possible to substantially improve the durability of the extensible joint.

The joint apparatus for an automobile exhaust pipe in accordance with the present invention, makes it possible to eliminate the leakage of the exhaust gases as practically as possible, excels in durability, and is capable of assuring ease of vibration of a degree similar to that of a joint apparatus for a single pipe.

Hereafter, a more detailed description will be given of a preferred embodiment of the present invention with reference to the accompanying drawings. It should be noted that the present invention is not limited to the embodiment.

DESCRIPTION OF THE PREFERRED EMBODIMENT

Figure 1:
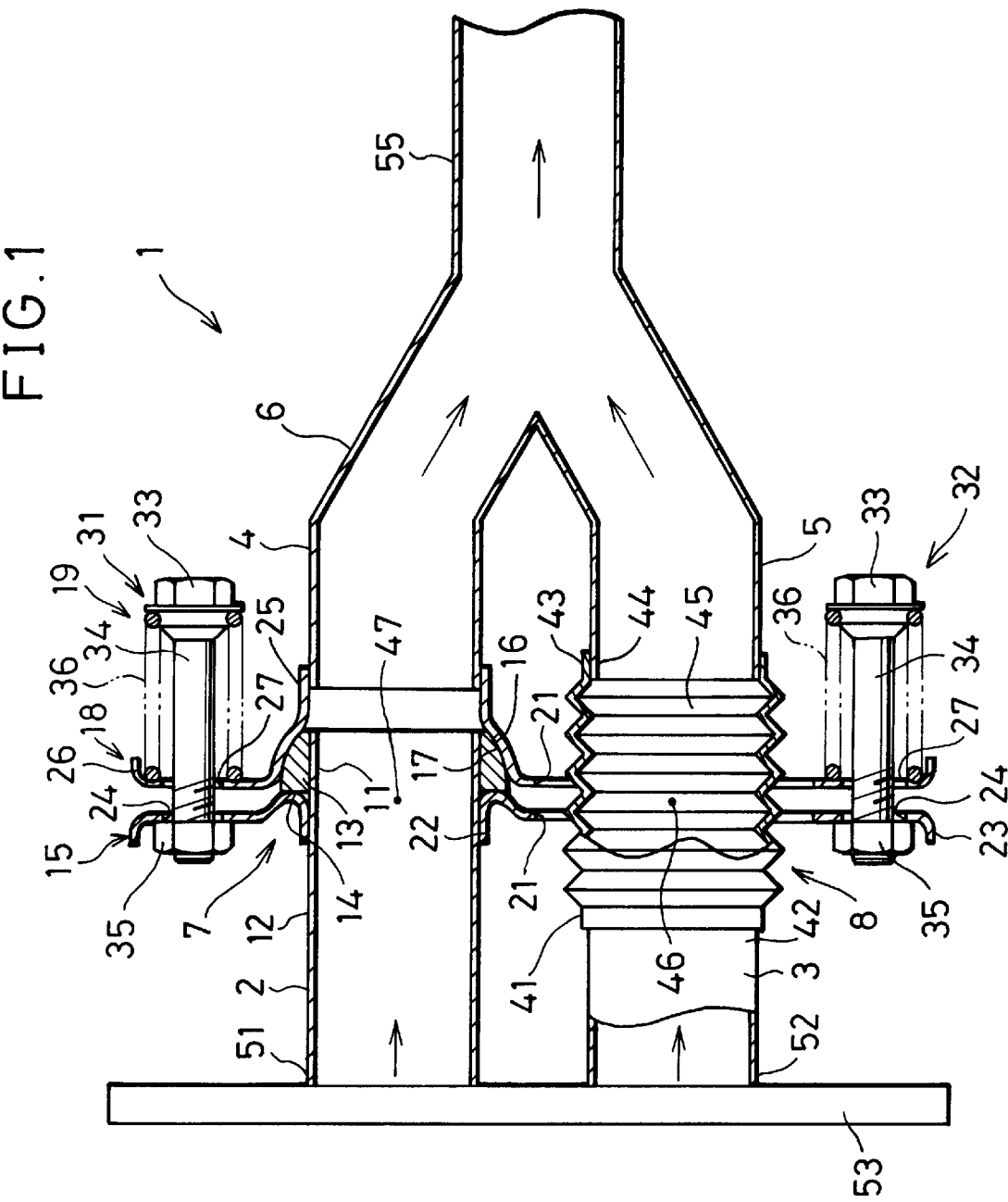
FIG. 1 is an explanatory cross-sectional view of a preferred embodiment of the present invention.
Figure 2:
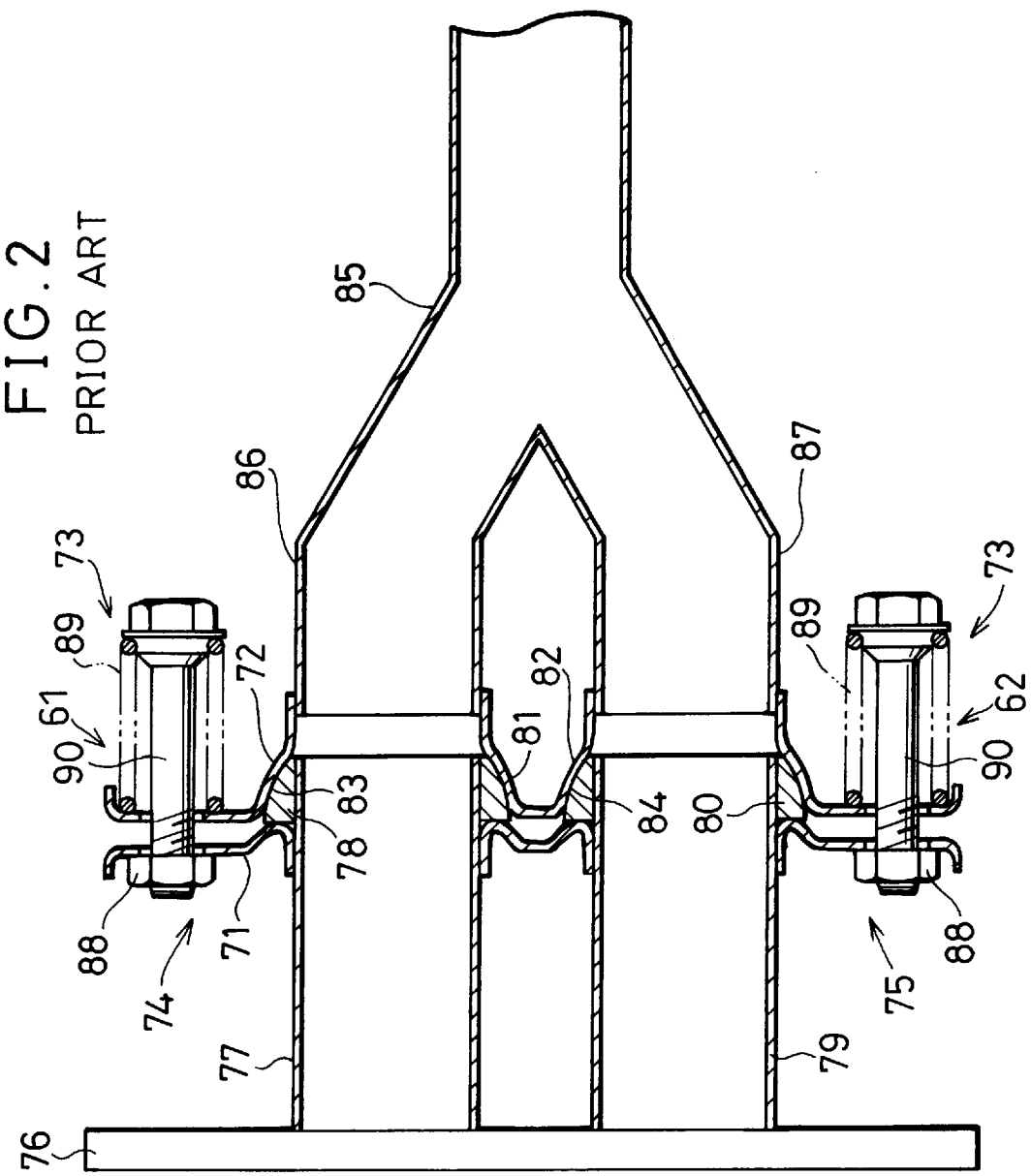
FIG. 2 an explanatory diagram of a conventional joint apparatus for an automobile exhaust pipe.

In FIG. 1, in a joint apparatus 1 for an automobile exhaust pipe in this example, each of a pair of juxtaposed exhaust pipes 2 and 3 and each of a pair of mutually coupled branch pipes 4 and 5 of a bifurcated exhaust pipe 6 are coupled to each other. The joint apparatus 1 is provided with a spherical joint 7 for coupling the exhaust pipe 2 to one branch pipe 4 of the bifurcated exhaust pipe 6 disposed in correspondence with the exhaust pipe 2, as well as a flexible extensible joint 8 for coupling the exhaust pipe 3 to the other branch pipe 5 disposed in correspondence with the exhaust pipe 3.

The spherical joint 7 is provided with a spherical annular seal member 13 fitted over an outer peripheral surface 12 of one end 11 of either one of the exhaust pipe 2 and the branch pipe 4 (in this embodiment, the exhaust pipe 2); a flange means 15 which abuts against a bottom surface 14 of the spherical annular seal member 13 and is secured to the outer peripheral surface 12 of the exhaust pipe 2 by means of welding or the like; a flange means 18 which has a spherical seat 17 on which a spherical annular surface 16 of the spherical annular seal member 13 is slidably seated, and which is secured to the branch pipe 4 by means of welding or the like; and a resilient means 19 for causing the two flange means 15 and 18 to approach each other in the axial direction by a resilient force so as to cause the spherical seat 17 to be resiliently pressed against the spherical annular surface 16.

The two flange means 15 and 18 are respectively provided with through holes 21, and the extensible joint 8 is disposed in such a manner as to be passed through the through holes 21. The flange means 15 is provided with a proximal portion 22 secured to the outer peripheral surface 12 of the exhaust pipe 2 by means of welding or the like and a nut-receiving portion 23 extending integrally from the proximal portion 22 in the radially outward direction. The bottom surface 14 of the spherical annular seal member 13 abuts against the proximal portion 22, and two through holes 24 are formed in the nut-receiving portion 23 in addition to the through hole 21. The flange means 15 is formed in an elliptical shape (oval shape) in terms of its substantially overall planar configuration. The flange means 18 is provided with a proximal portion 25 secured to the branch pipe 4 by means of welding or the like and a spring-receiving portion 26 extending integrally from the proximal portion 25 in the radially outward direction. The spherical seat 17 on which the spherical annular surface 16 of the spherical annular seal member 13 is slidably seated is formed on the proximal portion 25, and two through holes 27 are formed in the spring-receiving portion 26 in addition to the through hole 21. In the same way as the flange means 15, the flange means 18 is formed in an elliptical shape (oval shape) in terms of its substantially overall planar configuration.

The resilient means 19 is provided with a pair of resilient devices 31 and 32 fixed to the two flange means 15 and 18 in an axially symmetric manner, and the resilient device 31 is disposed closer to the spherical annular surface 16 than the resilient device 32, while the resilient device 32 is disposed on an outer side of the through holes 21. The resilient devices 31 and 32 are respectively provided with bolts 34 having enlarged-head portions 33 and passed through the through holes 24 and 27; nuts 35 each meshing with the bolt 34 and seated on the nut-receiving portion 23; and coil springs 36 each interposed between the enlarged-head portion 33 and the spring-receiving portion 26. The spring constant of the coil spring 36 of the resilient device 32 is arranged to be smaller than the spring constant of the coil spring 36 of the resilient device 31 so as to balance resilient pressing forces of the spherical seat 17 against the spherical annular surface 16 by means of the resilient devices 31 and 32.

The flexible extensible joint 8 is provided with a bellows 45 whose one end 41 is secured to one end 42 of the exhaust pipe 3 and another end 43 to one end 44 of the branch pipe 5 by means of welding or the like, respectively. In this example, a center 47 of the radius of curvature of the spherical annular surface 16 of the spherical annular seal member 13 is positioned with respect to the extensible joint 8, such that in the relative swinging motion of the bifurcated exhaust pipe 6 with respect to the pair of exhaust pipes 2 and 3, particularly in the relative swinging motion in a direction perpendicular to the plane of the drawing of FIG. 1, a maximum bending occurs in the extensible joint 8 at an axially intermediate position 46 in the extensible joint 8.

As the spherical annular seal member 13, a heatresistant one which is formed by subjecting wire mesh and expanded graphite to compression molding is preferable, but is not limited to the same.

The exhaust pipes 2 and 3 in this example are attached to a flange 53 of a manifold at their other ends 51 and 52, respectively. The arrangement provided is such that exhaust gases from a first cylinder, for example, are introduced into the exhaust pipe 2, while exhaust gases from, for example, a fourth cylinder in which timings of intake, compression, combustion, and exhaust are utterly reverse to those of the first cylinder are introduced into the exhaust pipe 3. The exhaust gases introduced into the exhaust pipes 2 and 3 are introduced to the muffler side via the branch pipes 4 and 5 and an integrating pipe 55 of the bifurcated exhaust pipe 6.

In the above-described joint apparatus 1, the relative swinging motion of the bifurcated exhaust pipe 6 with respect to the exhaust pipes 2 and 3 becomes possible due to the relative sliding motion of the spherical seat 17 with respect to the spherical annular surface 16 and the extension and contraction and the bending of the bellows 45, thereby reducing the vibrations transmitted from the exhaust pipes 2 and 3 to the bifurcated exhaust pipe 6. Since the exhaust pipe 3 and the branch pipe 5 are coupled to each other by the extensible and bendable bellows 45, the relative swinging motion of the bifurcated exhaust pipe 6 with respect to the exhaust pipes 2 and 3 in a plane parallel to the plane of the drawing of FIG. 1 is effected centering on the center 47 without causing a gap between the spherical annular surface 16 and the spherical seat 17. Accordingly, the risk of the leakage of exhaust gases is eliminated. In addition, since the relative axial displacement and relative swinging motion of the bifurcated exhaust pipe 6 with respect to the exhaust pipes 2 and 3 are restricted by the spherical joint 7, the bellows 45 is prevented from being excessively contracted and extended or bent.

In addition, since the relative swinging motion is effected centering on the center 47, a maximum bending occurs in the extensible joint 8 substantially at its axially intermediate position 46. Accordingly, the concentration of the stress is unlikely to occur in the extensible joint 8, and the bending stress occurs uniformly in the extensible joint 8, so that the extensible joint 8 can be used over long periods of time without becoming damaged. In addition, since the spring constant of the coil spring 36 of the resilient device 32 is arranged to be smaller than the spring constant of the coil spring 36 of the resilient device 31 so as to balance resilient pressing forces of the spherical seat 17 against the spherical annular surface 16 by means of the resilient devices 31 and 32, it is possible to provide a vibration-reducing function similar to that of an ordinary single-type spherical joint.

What is claimed is:

1. A joint apparatus for an automobile exhaust pipe in which each of a pair of juxtaposed exhaust pipes and each of a pair of mutually coupled branch pipes of a bifurcated exhaust pipe are coupled to each other, comprising:

a joint having a spherical surface for coupling one of the pair of exhaust pipes to on of the branch pipes of the bifurcated exhaust pipe which is disposed in correspondence with the one exhaust pipe; and a flexible extensible joint for coupling another one of the pair of exhaust pipes to another one of the branch pipes which is disposed in correspondence with the another exhaust pipe; wherein said spherical surface joint is provided with a spherical annular seal member fitted over one end of one of the one exhaust pipe and the one branch pipe; a first flange means secured to one of the one exhaust pipe and the one branch pipe; a second flange means which has a spherical surface seat on which a spherical annular surface of said spherical annular seal member is slidably seated, and which spherical annular seat is secured to another one of the one exhaust pipe and the one branch pipe; and resilient means for causing said first and second flange means to approach each other by a resilient force so as to cause the spherical seat to be resiliently pressed against the spherical annular surface.

2. A joint apparatus for an automobile exhaust pipe according to claim 1, wherein said first flange means and said second flange means are respectively provided with through holes, and said flexible extensible joint is disposed by being passed through the through holes.

3. A joint apparatus for an automobile exhaust pipe Ad according to claim 2, wherein said resilient means is provided with a pair of resilient devices fixed to said first flange means and said second flange means in an axially symmetric manner, one of said pair of resilient devices is disposed closer to the spherical annular surface than another one of said pair of resilient devices, while said another one of said pair of resilient devices is disposed on an outer side of the through holes, and a spring constant of said another one of said pair of resilient devices is arranged to be smaller than a spring constant of said one resilient device so as to balance resilient pressing forces of the spherical surface seat against the spherical annular surface by means of said pair of resilient devices.

4. A joint apparatus or an automobile exhaust pipe according to claim 1, wherein said flexible extensible joint is provided with a bellows having one end secured to the other one of the exhaust pipes and another end secured to the other one of the branch pipes.

5. A joint apparatus for an automobile exhaust pipe according to claim 1, wherein a center of the radius of curvature of said spherical surface is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

6. A joint apparatus for an automobile exhaust pipe according to claim 2, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

7. A joint apparatus for an automobile exhaust pipe according to claim 3, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

8. A joint apparatus for an automobile exhaust pipe according to claim 4, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

9. A joint apparatus for an automobile exhaust pipe in which each of a pair of juxtaposed exhaust pipes and each of a pair of mutually coupled branch pipes of a bifurcated exhaust pipe are coupled to each other, comprising:

a joint having a spherical surface for angularly movably coupling one of the pair of exhaust pipes to one of the branch pipes of the bifurcated exhaust pipe which is disposed in correspondence with the one exhaust pipe; and a flexible extensible joint for angularly axially movably coupling another one of the pair of exhaust pipes to another one of the branch pipes which is disposed in correspondence with the another exhaust pipe; wherein said spherical surface joint includes a spherical annular seal member fitted over one end of one of the one exhaust pipe and the one branch pipe, a spherical surface seat on which a spherical annular surface of said spherical annular seal member is slidably seated, and which spherical annular seat is secured to another one of the one exhaust pipe and the one branch pipe, and resilient means for causing the spherical surface seat to be resiliently pressed against the spherical annular surface.

10. A joint apparatus for an automobile exhaust pipe according to claim 9, wherein said spherical surface joint includes a first flange means secured to one of the one exhaust pipe and the one branch pipe, and a second flange means carrying said spherical surface seat and secured to another one of the one exhaust pipe and the one branch pipe, said first flange means and said second flange means being respectively provided with through holes, and said flexible extensible joint being disposed by being passed through the through holes.

11. A joint apparatus for an automobile exhaust pipe according to claim 10, wherein said resilient means is provided with a pair of resilient devices fixed to said first flange means and said second flange means in an axially symmetric manner, one of said pair of resilient devices being disposed closer to the spherical annular surface than another one of said pair of resilient devices, while said another one of said pair of resilient devices is disposed on an outer side of the through holes, and a spring constant of said another one of said pair of resilient devices being arranged to be smaller than a spring constant of said one resilient device so as to balance resilient pressing forces of the spherical surface seat against the spherical annular surface by means of said pair of resilient devices.

12. A joint apparatus for an automobile exhaust pipe according to claim 9, wherein said flexible extensible joint is provided with a bellows having one end secured to the other one of the exhaust pipes and another end secured to the other one of the branch pipes.

13. A joint apparatus for an automobile exhaust pipe according to claim 9, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

14. A joint apparatus for an automobile exhaust pipe according to claim 10, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

15. A joint apparatus for an automobile exhaust pipe according to claim 11, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

16. A joint apparatus for an automobile exhaust pipe according to claim 12, wherein a center of the radius of curvature of said spherical surface joint is positioned with respect to said extensible joint, such that in the relative swinging motion of the bifurcated exhaust pipe with respect to the pair of exhaust pipes, a maximum bending occurs in said extensible joint at an axially intermediate position in said flexible extensible joint.

17. A joint apparatus for an automobile exhaust pipe according to claim 2, wherein said flexible extensible joint is provided with a bellows having one end secured to the other one of the exhaust pipes and another end secured to the other one of the branch pipes.

18. A joint apparatus for an automobile exhaust pipe according to claim 7, wherein said flexible extensible joint is provided with a bellows having one end secured to the other one of the exhaust pipes and another end secured to the other one of the branch pipes.

19. A joint apparatus for an automobile exhaust pipe according to claim 10, wherein said flexible extensible joint is provided with a bellows having one end secured to the other one of the exhaust pipes and another end secured to the other one of the branch pipes.

20. A joint apparatus for an automobile exhaust pipe according to claim 11, wherein said flexible extensible joint is provided with a bellows having one end secured to the other one of the exhaust pipes and another end secured to the other one of the branch pipes.

* * * * *

UNITED STATES PATENT AND TRADEMARK OFFICE
CERTIFICATE OF CORRECTION

PATENT NO.  : 5,887,907
DATED       : March 30, 1999
INVENTOR(S) : KUBOTA et al

It is certified that error appears in the above-identified patent and that said Letters Patent is hereby corrected as shown below:

Claim 1, line 6, "on" should read --one--.

Claim 3, line 1, delete "Ad".

Claim 4, line 1, "or" should read --for--.

Claim 18, line 2, "7" should read --3--.

Signed and Sealed this

Twenty-fourth Day of August, 1999

Attest:

Q. TODD DICKINSON

*Attesting Officer*     *Acting Commissioner of Patents and Trademarks*